United States Patent
Williams et al.

(10) Patent No.: US 8,112,322 B2
(45) Date of Patent: Feb. 7, 2012

(54) AUTOMATED SYSTEM FOR MANAGING BABY CARE PRODUCTS

(75) Inventors: Rodney Bernard Williams, Cincinnati, OH (US); Katherine Marie Moeggenberg, Silverton, OH (US); Charlotte Vallory La Niear, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/219,733

(22) Filed: Aug. 29, 2011

(65) Prior Publication Data
US 2011/0313881 A1    Dec. 22, 2011

Related U.S. Application Data

(62) Division of application No. 12/715,616, filed on Mar. 2, 2010, now Pat. No. 8,032,426.

(51) Int. Cl.
    *G06Q 30/00* (2006.01)
(52) U.S. Cl. ...................................................... 705/26.8
(58) Field of Classification Search ..................... 705/26, 705/26.1, 26.8, 27
    See application file for complete search history.

(56) References Cited

U.S. PATENT DOCUMENTS

| | | |
|---|---|---|
| 5,774,874 A | 6/1998 | Veeneman et al. |
| 5,970,474 A | 10/1999 | LeRoy et al. |
| 6,092,052 A | 7/2000 | Ziarno |
| 6,556,975 B1 | 4/2003 | Wittsche |
| 6,609,106 B1 | 8/2003 | Robertson |
| 6,618,753 B2 | 9/2003 | Holland et al. |
| 6,873,967 B1 | 3/2005 | Kalagnanam |
| 6,925,444 B1 | 8/2005 | McCollom |
| 6,963,851 B1 | 11/2005 | Szabo et al. |
| 6,999,941 B1 | 2/2006 | Agarwal |
| 7,010,512 B1 | 3/2006 | Gillin |
| 7,013,292 B1 | 3/2006 | Hsu |
| 7,039,601 B2 | 5/2006 | Gary |
| 7,117,173 B1 | 10/2006 | Ambani |
| 7,324,964 B2 | 1/2008 | Gronberg et al. |
| 7,324,965 B2 | 1/2008 | Martineau |
| 7,356,490 B1 | 4/2008 | Jacobi |
| 7,444,297 B2 | 10/2008 | Shah |
| 7,454,376 B1 | 11/2008 | Argenbright |
| 7,603,292 B1 | 10/2009 | Bragg |
| 7,660,746 B1 | 2/2010 | Song |
| 7,698,171 B2 | 4/2010 | Rampell et al. |
| 7,782,194 B2 | 8/2010 | Stawar et al. |
| 7,881,979 B2 | 2/2011 | Shaer |
| 2001/0037263 A1 | 11/2001 | Hirota et al. |
| 2002/0010668 A1 | 1/2002 | Travis et al. |

(Continued)

FOREIGN PATENT DOCUMENTS

EP    2075713 A1    7/2009

(Continued)

OTHER PUBLICATIONS

Babies-R-Us.com Registry cached archive from Jun. 18, 2009, accessed via WaybackMachine.org on Jan. 5, 2011.

(Continued)

*Primary Examiner* — Jeffrey A Smith
*Assistant Examiner* — Brandy A Zukanovich
(74) *Attorney, Agent, or Firm* — Andrew A Paul

(57) ABSTRACT

A method, in a computer-based online system having a memory, for managing an account for purchasing baby care products by a particular user, wherein the account is for use with a particular category of baby care products, including diapers.

7 Claims, 14 Drawing Sheets

U.S. PATENT DOCUMENTS

| | | |
|---|---|---|
| 2003/0177054 A1 | 9/2003 | Reinbold et al. |
| 2004/0078283 A1 | 4/2004 | Gary |
| 2005/0010486 A1 | 1/2005 | Pandhe |
| 2005/0033650 A1 | 2/2005 | Robertson |
| 2005/0091120 A1 | 4/2005 | Auletta |
| 2005/0097003 A1 | 5/2005 | Linker |
| 2005/0102496 A1 | 5/2005 | Veeneman |
| 2005/0108109 A1 | 5/2005 | Wittsche |
| 2005/0108113 A1 | 5/2005 | Wittsche |
| 2005/0261916 A1 | 11/2005 | McCall et al. |
| 2006/0069627 A1 | 3/2006 | Petersen |
| 2006/0080174 A1 | 4/2006 | Veeneman et al. |
| 2006/0161484 A1 | 7/2006 | Pandhe |
| 2006/0167780 A1 | 7/2006 | Friedman |
| 2006/0178946 A1 | 8/2006 | Agarwal |
| 2007/0162350 A1 | 7/2007 | Friedman |
| 2008/0021767 A1 | 1/2008 | Benson |
| 2008/0040240 A1 | 2/2008 | Covington |
| 2008/0052191 A1 | 2/2008 | Walker et al. |
| 2008/0077506 A1 | 3/2008 | Rampell et al. |
| 2008/0091528 A1 | 4/2008 | Rampell et al. |
| 2008/0109326 A1 | 5/2008 | Meredith |
| 2008/0162316 A1 | 7/2008 | Rampell et al. |
| 2008/0172304 A1 | 7/2008 | Berkowitz |
| 2008/0172307 A1 | 7/2008 | Hurowitz |
| 2008/0177635 A1 | 7/2008 | Handel |
| 2008/0183676 A1 | 7/2008 | Holland |
| 2008/0201924 A2 | 8/2008 | Sinclair |
| 2008/0243705 A1 | 10/2008 | Paintin |
| 2008/0306852 A1 | 12/2008 | Kerestic |
| 2009/0079182 A1 | 3/2009 | Dold |
| 2009/0099941 A1 | 4/2009 | Berkowitz |
| 2009/0125410 A1 | 5/2009 | Perlman |
| 2009/0164340 A1 | 6/2009 | Lluch |
| 2009/0216549 A1 | 8/2009 | Causey |
| 2009/0254447 A1 | 10/2009 | Blades |
| 2009/0265387 A1 | 10/2009 | Gabriel |
| 2009/0276284 A1 | 11/2009 | Yost |
| 2009/0276719 A1 | 11/2009 | Pardehpoosh |
| 2009/0327121 A1 | 12/2009 | Carroll |
| 2010/0106592 A1 | 4/2010 | Brown |
| 2010/0235257 A1 | 9/2010 | Bentue-Ferrer |

FOREIGN PATENT DOCUMENTS

| | | | |
|---|---|---|---|
| WO | WO 2008/137049 A1 | 11/2008 | |

OTHER PUBLICATIONS

MyRegistry.com Registry cached archive from Jun. 5, 2009, accessed via WaybackMachine.org on Jan. 5, 2011.

Target.com Registry cached archive from Jun. 27, 2009, accessed via WaybackMachine.org on Jan. 5, 2011.

Nancy L. Ross, "What do Brides and Grooms Really Want? China? You Bet, but Hardware and Cash Are High on the List", May 30, 1991, The Washington Post, p. t12.

International Search Report, PCT/US 11/26563, mailed Oct. 3, 2011, 14 pages.

AUTOMATED SYSTEM FOR MANAGING BABY CARE PRODUCTS

CROSS REFERENCE TO RELATED APPLICATION

This application is a divisional of U.S. application Ser. No. 12/715,616 filed on Mar. 2, 2010 now U.S. Pat. No. 8,032,426, which is hereby incorporated by reference in its entirety.

FIELD OF THE INVENTION

This disclosure relates generally to facilitating purchases of consumer products, and more particularly, to an apparatus and method for managing a registry for baby care products.

BACKGROUND OF THE INVENTION

As is known, today many retailers offer personalized gift registries so that a shopper can compile a list of items he or she wishes to receive, and friends and family can select gifts from among the listed items. For example, an expectant mother may register at a retailer that specializes in baby care products and infant products in general. People invited to the "baby shower" or a similar event can then consult the registry maintained by the retailer prior to purchasing gifts. However, because the personalized gift registry includes only those items that are being offered by the retailer, the mother's choice of items is necessarily limited. On the other hand, registering at multiple retailers to set up several gift registries is likely to create confusion and logistical difficulties.

Further, expectant mothers as well as parents of infants often engage in repeated purchases of the same or similar baby care products (for example, diapers or other non-durable goods) during a relatively long period of time, and in that respect one-time gifts selected via a gift registry do not fully address the parent's needs. The difficulty in predicting the exact amount and the type of baby care products (for example, diaper size) that will be needed at each stage of growth of the baby makes such products a generally unlikely choice for a one-time gift. Meanwhile, as is known, diaper purchases and similar recurring expenses account for a large percentage of the total expenses associated with raising a baby.

In the recent years, it has been known to offer products, including baby care products, online in addition to (or instead of) physical stores. Customers also expand their product awareness through online shopping, and generally do not limit their purchases to a single retailer or provider. However, many still prefer an in-person shopping experience with respect to at least some products, and some prefer a "mixed" experience where some products are purchased online, other products are purchased in person, and yet other products are selected in person and subsequently purchased online. Yet in-person shopping experience in general, and purchasing of baby care products in particular, has not been seamlessly integrated with online shopping.

SUMMARY OF THE INVENTION

To allow a parent or another user to select baby care products from multiple retailers and manufacturers, an online computer-based baby care products management system (hereinafter, "the baby care system") stores identifiers of baby care products selected at various physical and virtual locations in a registry specific to the user. In particular, a user can select a product via an online interface from a list maintained by the baby care system, by scanning in the product code of an item at a physical locations of a participating retailer, by partially or fully importing an existing registry associated with a certain retailer, by partially or fully importing an existing registry associated with another user of the baby care system, or by activating an appropriate control provided at a website maintained by a participating retailer, and add the selected product to the registry. During the lifetime of the registry, participants such as friends, family, baby shower invitees, etc. access the registry via an online interface by supplying the name of the user or another identifier, make purchases or update the status of items (for example, from "available" to "purchased"), exchange comments regarding various items, etc. In some embodiments, some or all registry participants are also allowed to add or remove items from the registry.

In some embodiments, a participating retailer is provided with an application programming interface ("API") to integrate a retailer-specific registry into a new or existing registry associated with the baby care system. When configuring a new registry, a user specifies which retailer-specific registries are to be imported into the registry. The baby care system imports the specified registries partially or in full according to user selections. In some embodiments, an item from an imported retailer-specific registry is assigned a link to the retailer, so that participants see at which retailer the item was originally selected. When a participant purchases the item, the selection and the purchase request are automatically routed to the retailer website.

In an embodiment, users and participants utilize a toolbar operating in a browsing application (for example, Internet Explorer) to efficiently interact with the baby care system. In one scenario, a user visits an online retailer, selects an item, and activates a control (for example, an "add" button") on the toolbar to quickly add the selected item to her registry. To this end, the participating retailer may support an appropriate API. In another embodiment, the function for quickly adding the selected item to the registry is implemented as another type of a web site control (for example, a hyperlink, a banner, etc.)

In some embodiments, the baby care system is integrated with one or several online retailers so that a user can search the product database of a specified retailer, for example, when adding items to the registry. In some embodiments, the baby care system is also integrated with retailers that include physical retail locations, and receives product selections from participants visiting these retail locations. In one such embodiment, an application running on a portable, smart device receives a universal product code (UPC) specified in the form of a barcode on a product, and transmits the UPC and the identity of the retailer to the baby care system. In response, the baby care system updates the registry with the specified product and associates the selection with the specified retailer.

When processing requests to add a selected product to a registry, the baby care system in at least some of the embodiments checks the general category to which the product belongs (i.e., the stock-keeping units (SKUs) of the product), and adds the selected product to the registry only if the product is indeed a baby care item.

In some embodiments, users and/or registry participants access the baby care item management system via a standard web interface. In another embodiment, a social networking system supports an application programming interface (API) to directly access the baby care item management system. In some embodiments, the API is also supported on a standard platform of a smartphone (for example, Symbian OS). In other embodiments, an application is provided to interact with the baby care item management system using a manufacturer-specific platform (for example, the i-phone platform provided by Apple, Inc.).

In an embodiment, the system automatically notifies registry participants (such as friends and family) of the updates to the registry. In an embodiment, the system notifies the user regarding recent purchases, comments related to product selections or purchases, and other events. The system may further allow in-person shoppers to share the shopping experience (for example, selections, wish list items, etc.) with friends and family, in particular with respect to baby care products.

In addition to facilitating purchases of one-time gifts from various retailers, the baby care system in some embodiments allows participants to contribute any desired amount to an account dedicated to recurring purchases of baby care products such as diapers or other non-durable goods, for example (hereinafter, "a recurring purchase account"). Unlike a typical gift selected at the baby care system or the participating retailers, the recurring purchase account is used dynamically to make periodic purchases within a certain category. Thus, a mother can use the recurring purchase account to purchase diapers of a certain size during the first two postnatal months, and use the same recurring purchase account to purchase diapers of a bigger size during the next several months. The user initially sets up a recurring purchase account and specifies her preferences (for example, notifications upon every new contribution, notifications upon contributions in excess of a certain amount). The baby care system then processes contributions, updates the balance, and notifies the user regarding the status of the recurring purchase account in accordance with user preferences. In one embodiment, the recurring purchase account is presented to the user and to participants as one of the items listed in the registry, although participants cannot render the item "taken" (i.e., already purchased) by electing to purchase the item.

To implement fiscal management of the recurring purchase account, the baby care system in an embodiment automatically establishes a financial account with a financial institution such as a bank. The financial institution updates the balance when participants donate funds or when the user purchases baby care products using the recurring purchase account. In another embodiment, the baby care system associates the recurring purchase account with an aggregate gift card maintained by a gift card provider (for example, a retailer, a financial institution). In another embodiment, the baby care system generates a one-time coupon having an appropriate identifier code when a participant makes a donation, and supplies the one-time coupon, in an electronic or physical form, to the user. In yet another embodiment, the baby care store generates a virtual store (an "electronic store") for users who wish to redeem a portion or the entire balance of the recurring purchase account. By activating an appropriate control on a web interface of the baby care system, a user can be taken to a web page that displays selections of baby care products to which the balance of the recurring purchase account may be applied. In an embodiment, the electronic store supports secure API calls to a participating financial institution to perform financial transactions.

In an embodiment, the mother selects baby care products and pays for the selected items using the recurring purchase account. The interface may present the payment option as an alternative for paying using a credit card, for example.

The baby care system includes one or several servers, each of which includes a computer-readable memory on which software instructions are stored, and a processor to execute these instructions. The servers include a network interface to connect to a wide area network (WAN). In some embodiments, the baby care system includes a database to store user data, participant data, item identifiers and other data related to items included in registries, recurring purchase account data, etc. In an embodiment, the baby care system includes a notification engine to detect updates to registries or recurring purchase accounts, identify users or participants to be notified regarding these changes, and generates electronic notifications that are delivered to email accounts, portable devices, social networking sites, etc. Some or all communications between the baby care system and hosts operated by users and participants are encoded in some embodiments of the baby care system. In an embodiment, the encoding is provided by the secure socket layer (SSL) and the appropriate digital certificates stored at the baby care system and/or hosts operated by users and participants.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
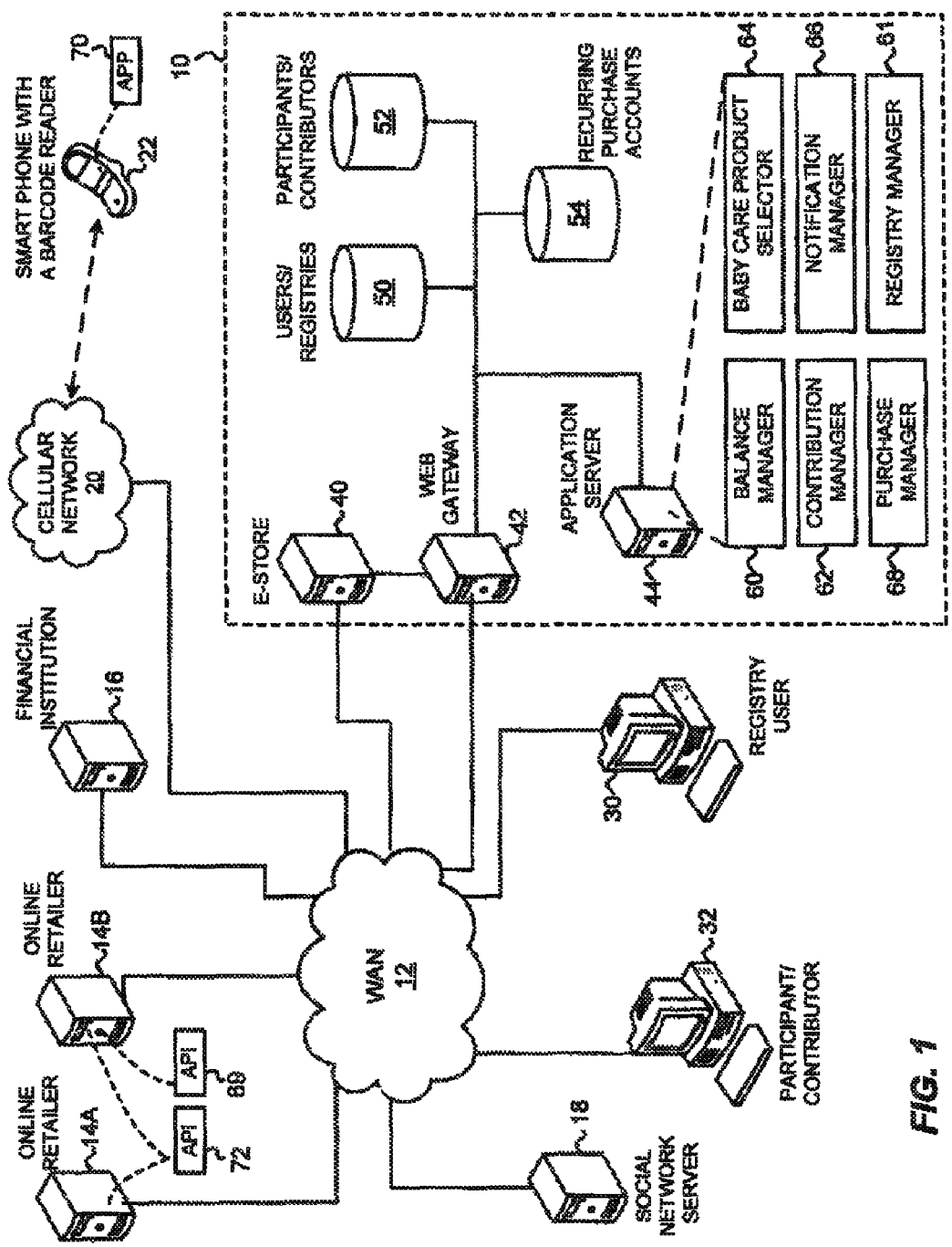
FIG. 1 illustrates an example arrangement in which a baby care item management system facilitates purchases of products and transfer of funds between users, participants, retailers, and financial institutions.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

For ease of explanation, techniques for operating product registries and recurring purchase accounts are discussed herein with reference to a particular category of products, i.e., baby care products. As used herein, the term "baby care product" refers to devices or consumer products designed for babies or small children (for example, diapers, wipes, clothes, bottlers, pacifiers, strollers) as well as consumer products indirectly associated with raising babies or small children (for example, baby-safe detergents, clothing to be worn by a mother during pregnancy, baby monitors). It will be understood, however, that systems similar to those described herein can support registries and/or recurring purchase accounts for any category of products, or need not be limited to any single category at all. The system and methods described herein may be applicable to a number of non-baby care products, such as adult incontinence products, feminine hygiene garments, facial tissues, bathroom tissues, paper towels and paper napkins. In another embodiment, the consumer products may be selected from, for example, a laundry or other type of detergents, fabric softeners, bleaches, fabric pretreaters and dryer sheets. In another embodiment, the consumer products may be selected from, for example, dishwashing detergents, glass cleaners, hard surface cleaners, fabric deodorizers, air fresheners, and hard surface sanitizers. In another embodiment, the consumer products may be selected from, for example, cosmetics, gift packs, electric or manual appliances, razors, hair products, skin products, pet food products. Thus, the systems and methods discussed below with reference to FIGS. 1-13 are provided by way of example only.

As used herein, the term "smart device" refers to any portable device capable of running one or more software applications. Smart devices also can be connected to the Internet or one or more computer networks. Smart devices include, but are not limited to, smartphones (for example, iPhone or Blackberry), pda's, netbooks, GPS devices, tablets, e-readers, iPads, mobile game consoles (for example, Nintendo DS, Sony PSP).

FIG. 1 illustrates a baby care product management system 10 communicatively coupled, via a wide area network (WAN) 12 such as the Internet, to several online retailer hosts 14A or 14B operated by respective retailers, a financial institution 16, a social network server 18, and a cellular network 20. Users such as expectant mothers, parents of small children and particularly infants, etc. access the system 10 via a station 30 and similar hosts coupled to the network 12. In particular, users access the system 10 to establish a gift registry for baby care products and related products, and/or an account for recurring purchases of baby care products such as diapers, for example. Thereafter, a user accesses his or her registry from a host 30 via a web site operated by the system 10, from the host 30 via a social network site such as the one supported by the server 18, from a portable smart device such as a smartphone 22 operating in the cellular network 20, or using other platforms to add items selected at physical or virtual locations to the registry, check updates to the registry, exchange comments related to the registry with friends and family, etc. The user can similarly access her recurring purchase account to view the balance and apply the balance toward online or in-person purchases of baby care products. In at least some of the embodiments, the system 10 also notifies users of updates to their registries and recurring purchase accounts.

Participants such as friends, family, etc. operate computer hosts such as a host 32 or portable devices to access the system 10 to make purchases of items listed in the corresponding registry, exchange comments and suggestions, and make contributions to the recurring purchase account. As used herein, the term participant refers to any person who has access to the registry of a particular user, and who can purchase products listed in the registry via the system 10. In an embodiment, the system 10 includes an electronic store server 40 to process requests from participants to purchase items listed in the registry. In some cases, the system 10 stores, for each products originally selected at an online retailer host 14A or 14B, a link to the corresponding retailer so that a participant's request to purchase the products is directed from the system 10 to the online retailer host 14A or 14B.

The system 10 in this example embodiment includes a web gateway 42 through which users and participants access applications run on the application server 44. For ease of illustration, each of the web gateway 42, the application server 44, and the electronic store server 40 is depicted as a single host. It is noted, however, that the each of the devices 40-44 can include one or several physical computer hosts, each including a processor to execute computer instructions stored on a computer-readable medium. The system 10 further includes a user/registry database 50 to store user information as well as registry data (for example, lists of products, links to retailers, comments) for each user who has set up a registry with the system 10. In some embodiments, the database 50 is implemented on a computer host in which a processor is coupled to a persistent memory. In an embodiment, the database 50 is a relational database that includes multiple tables interconnected via logical links, with one table including data records for respective baby care products, another table including data records for respective users, etc.

Further, a contributor database 52 stores information related to registry participants or recurring purchase account contributors. A recurring purchase account database 54 stores data such as account ownership, account balance, etc. associated with recurring purchase accounts. Similar to the database 50, the databases 52 and 54 can be implemented as relational databases operating on respective computer hosts and residing in persistent memory locations. In another embodiment, the system 10 includes a single database to store user and registry data, participant data, and recurring purchase account data.

With continued reference to FIG. 1, the application server 44 runs several applications such as a balance manager 60, a registry manager 61, a contribution manager 62, a baby care product selector 64, a notification manager 66, and a purchase manager 68. In an embodiment, each of the modules 60-68 is a software module implemented using a suitable programming language (for example, C++). Generally speaking, the modules 60-68 can be implemented in hardware, software, firmware, or any combination thereof.

The registry manager 61 facilitates registration of new users and creation of new registries. A user can create a new registry by supplying his or her preferences, contact information, etc. Upon receiving new registry data via the web gateway 42, the registry manager 61 populates a corresponding record in the database 50. In an embodiment, the user specifies an existing registry associated with a participating retailer, and the registry manager 61 automatically imports the specified registry into the system 10. To consider one such scenario, a user specifies that she wishes to import her gift registry maintained by the online retailer operating the server 14B into the system 10. The registry manager 61 transmits a request to the server 14B and, if the server 14B supports an API 69, the server 14B automatically supplies the requested gift registry data to the system 10. In another embodiment, the server 14B does not require a special-purpose API, and the gift registry data is supplied to the system 10 in a standard format such as Extensible Markup Language (XML), for example. The registry manager 61 then imports the received gift registry data into the database 50.

In another embodiment, a user specifies that she wishes to import the list of products from another user's gift registry maintained by the system 10. A new mother can, for example, import the registry of a more experienced mother. In an embodiment, the new mother can only import the registry of a user in whose registry the new mother is a participant. In another embodiment, a user can choose whether to allow other users to import her registry. Thus, for example, a mother shares her registry with another mother who then selects a portion or the entirety of the shared registry for importing into her own registry. Further, if desired, a new mother can import the registry of a "typical" mother, who may be a hypothetical mother whose registry has been developed by experts, as a template from which the new mother can begin developing her personalized registry.

In an embodiment, the registry manager 61 additionally asks the user whether she wishes to pre-populate the registry with a certain amount of baby care products such as diapers, for example.

The registry manager 61 can further ask the user for her preferred retailer. In an embodiment, the registry manager 61 automatically sets up a recurring purchase account to which participants can subsequently contribute. In some embodiments, the registry manager 61 asks the user to specify a preferred retailer for all potential purchases.

Upon registering a new user, the registry manager 61 can generate a customizable homepage for the user. The homepage in one embodiment supports a news feed to display messages from registry participants, comments from the user herself, and other users. In some embodiments, the homepage can be integrated with social networking sites such as Facebook, MySpace, etc. to display comments submitted via these sites, display users' and participants' pictures displayed at these sites, etc.

Referring next to the baby care product selector 64, a user in one scenario selects a baby care product at a website operated by the electronic store 40, activates the appropriate control such as a submit button, and the baby care product selector 64 adds the identifier of the selected product and, if necessary, additional description of the selected product to the database 50. In another scenario, a user visiting in person a participating retailer scans in the barcode of a product using the smartphone 22 using a product selection application 70 specific to the system 10. As discussed below with reference to FIGS. 9-10, the product selection application 70 forwards the identity of the product and, if desired, the identity of the retailer to the baby care product selector 64 via the network 20, the network 12, and the web gateway 42, and the baby care product selector 64 stores the received information in the database 50. In yet another scenario, the user visits a website operated by the online retailer host 14A, for example, selects a product, and activates a control such as hyperlink, and the online retailer host 14A executes an API 72 to transmit the selection to the baby care product selector 64 that, in turn, stores the selection in the database 50.

The purchase manager 68 updates the database 50 as participants purchase products listed in the registries. In accordance with an example scenario, a participant accesses the registry from the host 32 via the web gateway 42, specifies a user by entering the name, email address, or other identifier, and supplies authentication data such as login and password in at least some of the embodiments to view the list of products in the user's registry. Upon selecting a product originally selected at the electronic store server 40, the participant is prompted for a payment method selection and payment data, and the purchase manager 68 completes the transaction via one or several secure APIs that interact with the financial institution 16, for example. The purchase manager 68 then updates the appropriate field in the database 50 to indicate that the product has been purchased and, in some embodiments, stores the participant's identity in the data record associated with the purchased product.

In another scenario, the participant similarly accesses the registry at the system 10 but chooses to purchase a product originally selected at a website operated by a participating retailer. As indicated above, the system 10 in some embodiments retains the association between a baby care product and a retailer at whose physical or virtual store the product was chosen. The purchase manager 68 in this case automatically redirects the participant to the appropriate online retailer (for example, the online retailer server 14A) where the participant can complete the purchase. Additionally, the purchase manager 68 updates the registry in the database 50 to indicate that the product has been purchased.

To manage a recurring purchase account the user sets up for diapers, for example, the balance manager 60 and the contribution manager 62 respectively calculate the total amount of money accumulated in the account and processes requests from participants to pledge funds. A user first accesses the application server 44 to configure a new recurring purchase account, and the balance manager 60 generates a new data record in the database 54 and sets the initial account balance to zero. In some embodiments, the user specifies a certain financial goal, for example, "10 months worth of diapers" via a corresponding dialogue box. The user may then notify the participants of the new account, or the participants can learn about the account when viewing the user's registry. When participants access the system 10 to contribute funds to the specified recurring purchase account, the contribution manager 62 processes the requests as discussed below, and requests that the balance manager 60 update the account balance in accordance with the newly processed pledge. In an embodiment, the balance manager 60 calculates the approximate duration of a period during which the user can rely on the recurring purchase account for certain baby care products. For example, the balance manager 60 can process a $50 contribution to an account associated with diapers, update the overall account balance to $250, and estimate that the user has enough diapers for 1.5 months.

In some embodiments, the purchase manager 62 applies the recurring purchase account to purchase requests from the user. For example, the user in the above example may visit the electronic store 40, select a 100-count diaper pack, and elect to pay for the selected diaper pack with the funds accumulated in his or her recurring purchase account. In an embodiment, the balance manager 60 checks whether the recurring purchase account can be applied to the selected product. Thus, if the user wishes to apply the balance of the account toward a purchase of a stroller but the account is set up only for diapers, for example, the balance manager 60 can notify the purchase manager 62 that the request should be denied.

With continued reference to FIG. 1, the notification manager 66 can automatically detect and report to the user various events related to the user's registry and/or her recurring purchase account. To this end, the notification manager 66 can check user's preference stored in the user's profile in the database 50, for example. In an example embodiment, the notification manager 66 generates an email message for every new contribution to the recurring purchase account and every purchase of a product listed in the user's registry.

As indicated above, systems generally similar to the baby care product management system 10 in other embodiments can manage bridal or wedding registries, birthday registries, housewarming registries, graduation registries, new pet registries, etc. Further, recurring purchase accounts can be set up according to other schemes such as a "new mom" account, for example, to accumulate funds that a user can apply toward purchases of any products that match the new mom profile (for example, clothing, baby care products, strollers, etc.) or, as another example, a "new home" account to accumulate funds applicable to purchases of household products. If desired, a recurring purchase account can apply to several distinct categories, for example, "new home," "new parent," or "new pet owner."

Next, several example embodiments of a system for maintaining a recurring purchase account discussed with reference to FIGS. 2-5. Certain aspects of the web interface through which the system of FIGS. 2-5 may interact with users and participants is then discussed example screens of FIGS. 6, 8 and 11, an example of a web interface of a participating retailer that supports an API for interacting with the system 10 is discussed with reference to FIG. 7, and an example smartphone interface for adding products to a registry during in-person shopping is discussed with reference to FIGS. 9 and 10.

Figure 2:
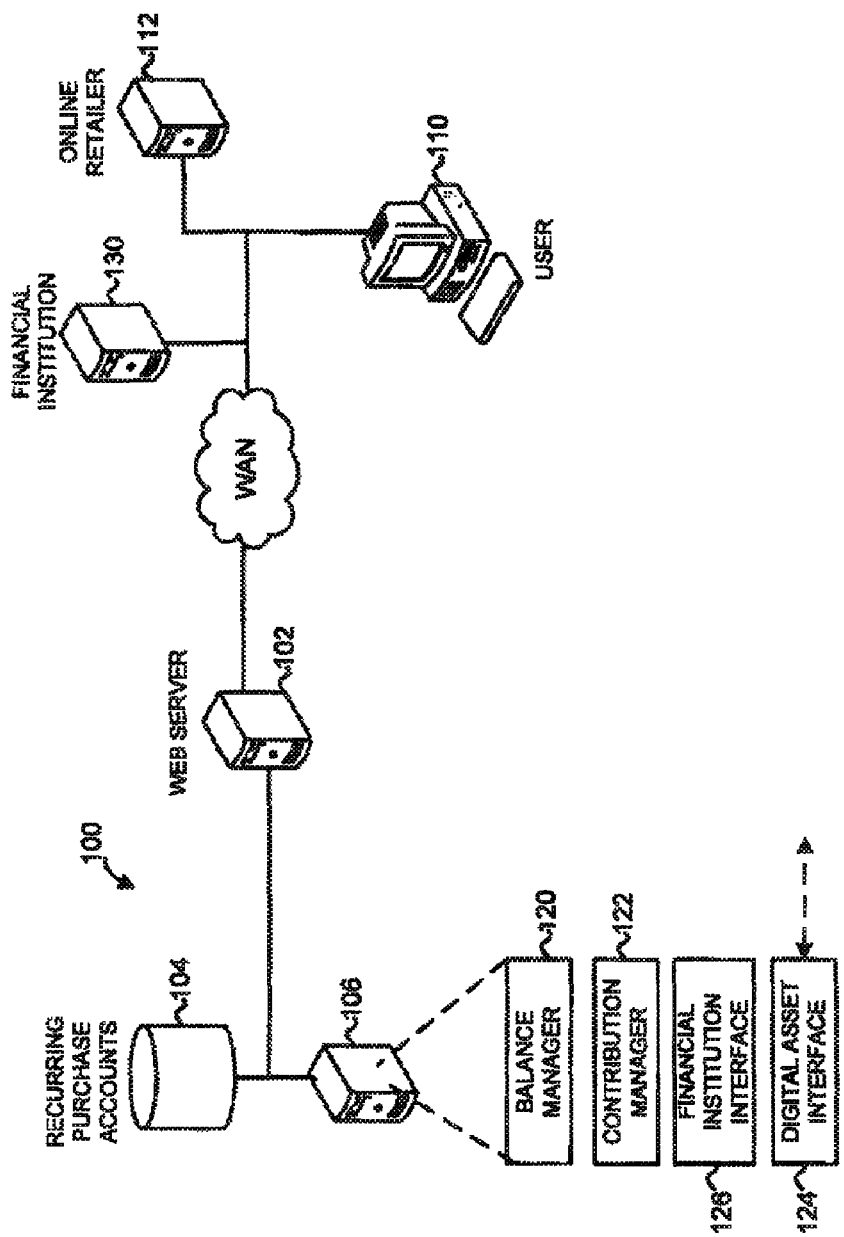
FIG. 2 illustrates a system for managing a recurring purchase account for baby care products that interacts with an external financial institution to implement fiscal management.

Referring first to FIG. 2, a system 100 for maintaining a recurring purchase account can operate independently of a system for managing a baby care product registry. In other words, the system 100 can separately provide the function of creating, updating, and applying a recurring purchase account for baby care products such as diapers, for example. The system 100 includes a web server 102, a recurring purchase account database 104, and an application server 106. Similar to the database 54, the database 104 in this embodiment stores data related to account ownership, account balance, etc. The web server 102 supports a web interface (for example, an interactive web site) via which users can access the system 100 from a host 110 or similar host, and via which the application server 106 can access a server 112 of an online retailer.

In the embodiment of FIG. 2, the application server 106 is a host having a memory and a processor to execute a balance manager 120, a contribution manager 122, a digital asset interface 124 and a financial institution interface 126 applications, each of which is stored as a set of instructions on a computer-readable memory. The balance manager 120 and the contribution manager 122 are generally similar to the balance manager 60 and the contribution manager 62 discussed above. In operation, the application server 106 processes contributions and updates the balance, and the user applies a portion or the entirety of the available account balance to purchases of baby care products at the web server 112 (for example, via a web site interface) operated independently by an online retailer.

The digital asset interface 124 allows the system 100 to operate with another system, such as a system for managing baby care product registries, so that an account set up at the system 10 is presented as a regular product to a registry user. As one example, a user can set up a recurring purchase using at the system 100, and list the account as one of the items in a registry operated by another system. In other embodiments, the digital asset interface 124 allows the system 100 to access a provider of baby care products such as diapers. In one such embodiment, the digital asset interface 124 is coupled to an external baby care item distribution system (not shown) through which the user can purchase baby care products, and where the user can use her recurring purchase account as a form of payment.

To implement fiscal management of contributions and purchases, the system 100 in this embodiment is communicatively coupled via the financial institution interface 126 to a financial institution 130 which may be a bank, for example. The system 100 maintains a data record for recurring purchase account in the database 104, and the financial institution 130 updates the account balance in response to requests from the system 100. Thus, the system 100 in this embodiment interacts with the external financial institution 130 to create a dedicated account (for example, a checking account) for each recurring purchase account maintained by the system 100.

As an alternative to the fiscal management techniques illustrated in FIG. 2, the online retailer that operates the server 112 can directly manage a fund or account and provide one or several APIs, to be used by the system 100, for creating the fund, contributing money to the fund, etc. The components 120 and 122 can invoke these APIs in response to commands received from participants and users.

Figure 3:
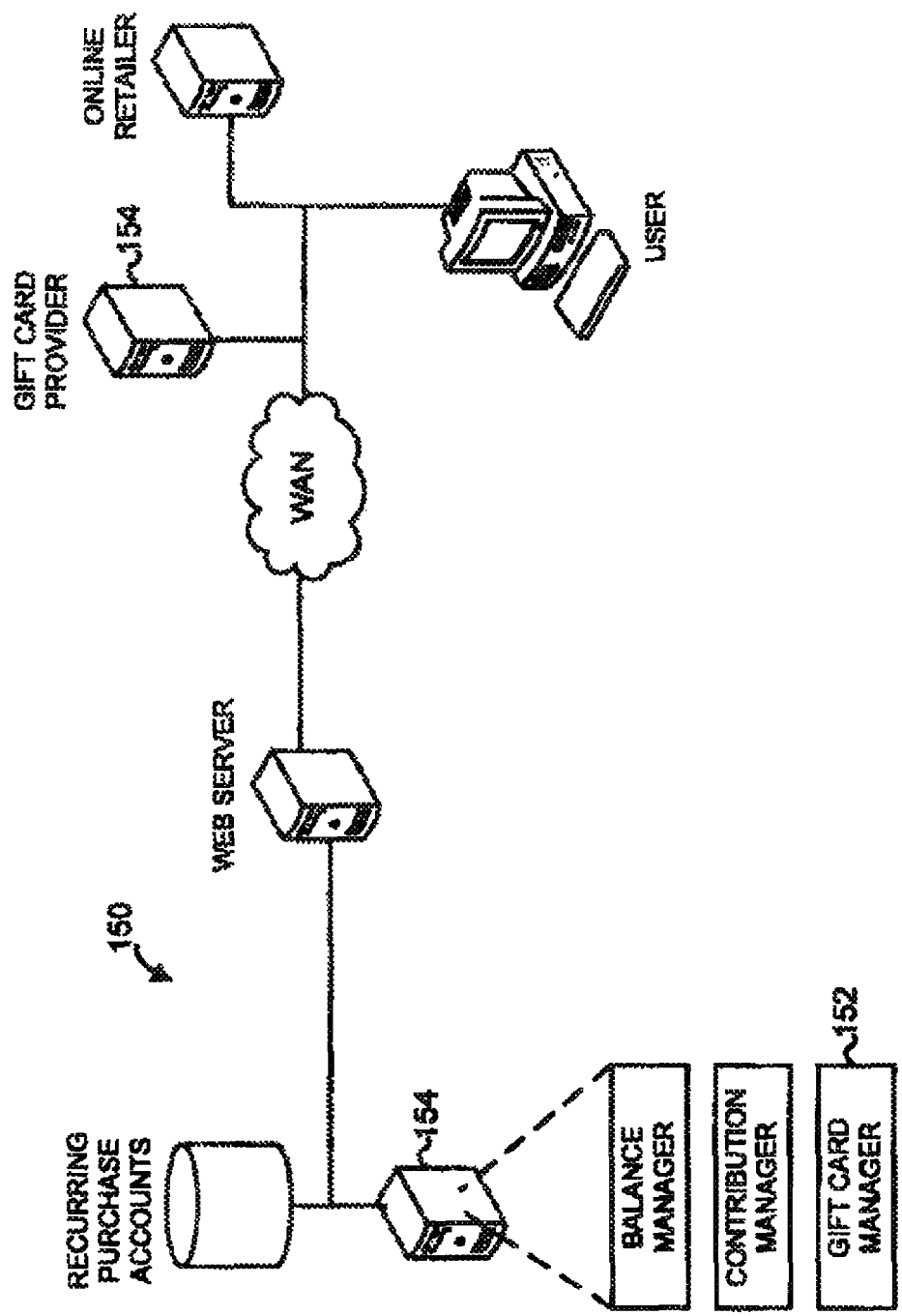
FIG. 3 illustrates a system for managing a recurring purchase account for baby care products that interacts with an external gift card provider to implement fiscal management of the account.

In another embodiment illustrated in FIG. 3, a system 150 is generally similar to the system 100 of FIG. 2, except that the system 150 associates each recurring purchase account with an aggregate gift card maintained by a gift card provider (for example, a retailer, a financial institution). A gift card manager 152 operating in an application server 154 interacts with a gift card provider 154 to request that a gift card be issued for a specified amount, and the gift card subsequently can be used for online or in-person purchases in a known manner, i.e., as a "traditional" gift card. If desired, the system 150 can present an interactive dialogue screen to the user via which the user can select his or her preferred online retailer. In some embodiments, the system 150 allows the user to select products to which the recurring purchase account is applicable via a web interface maintained by the system 150, and automatically contacts the preferred online retailer via an API provided by the preferred online retailer, for example.

Figure 4:
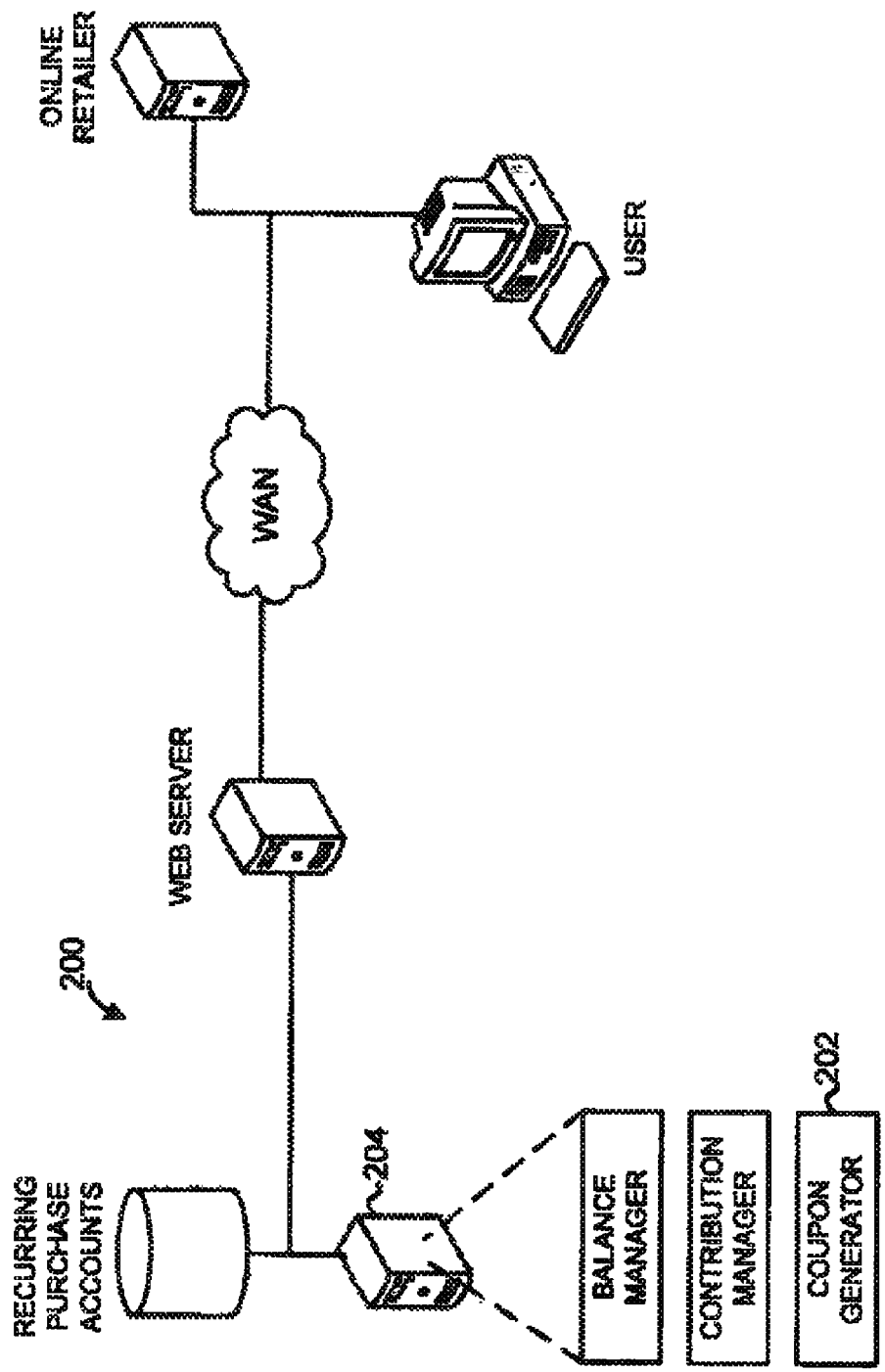
FIG. 4 illustrates a system for managing a recurring purchase account for baby care products that automatically generates limited-use coupons to implement fiscal management of the account.

On the other hand, a system 200 illustrated in FIG. 4 includes a coupon generator 202 operating in the application server 204. Upon receiving a notification that a participant has made a donation to a particular recurring purchase account for baby care products, the coupon generator 202 generates a one-time, single-use coupon having an appropriate identifier code when a participant makes a donation, and supplies the one-time coupon, in an electronic (for example, email) or physical (for example, paper) form, to the user. In an embodiment, the coupon generator 202 generates a unique identifier for every issued coupon so that the coupon is applicable only to the particular recurring purchase account.

Figure 5:
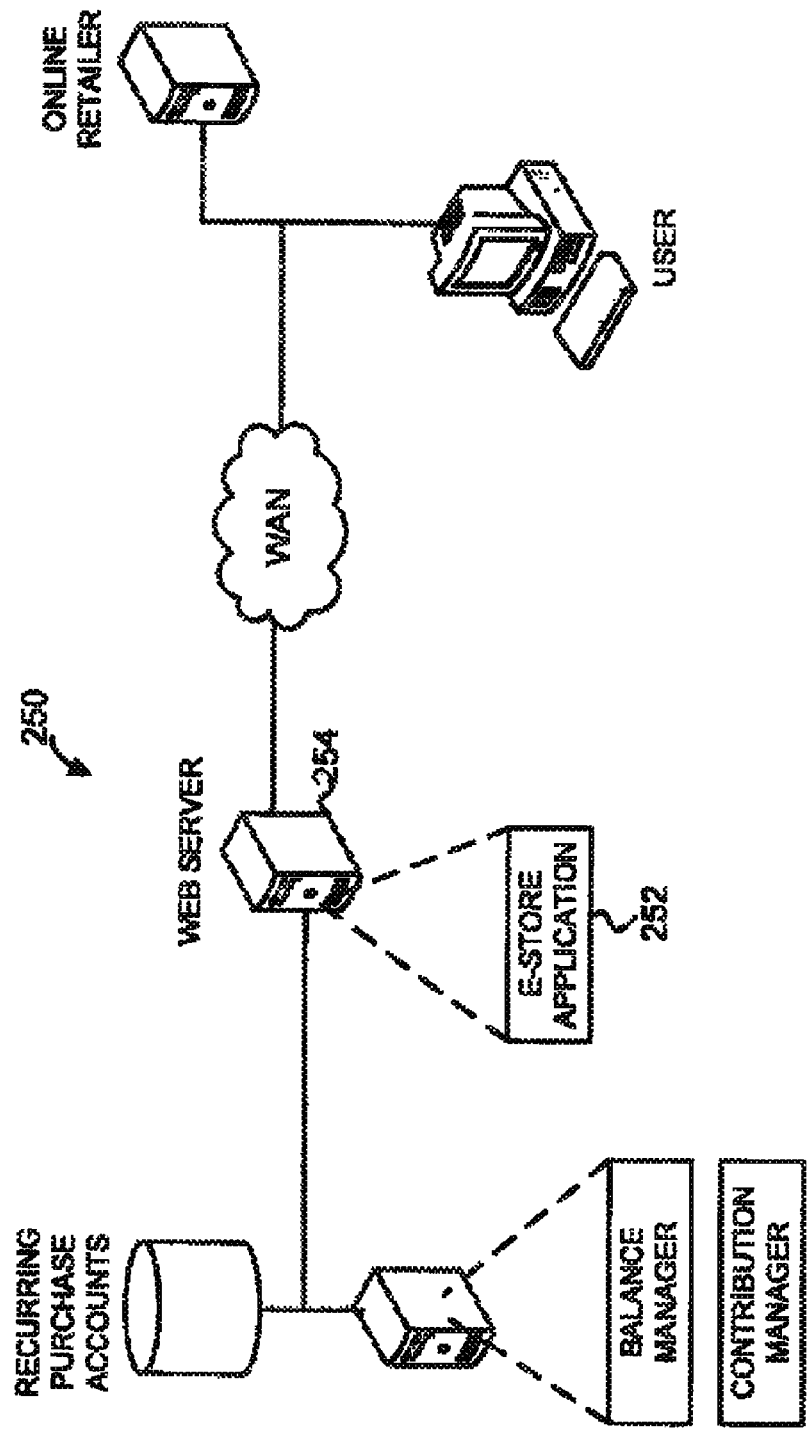
FIG. 5 illustrates a system for managing a recurring purchase account for baby care products that implements a virtual store of limited product scope to implement fiscal management of the account.

In yet another embodiment, a system 250 illustrated in FIG. 5 executes an electronic store application 252 in a web server 254 to maintain a virtual electronic store for users who wish to redeem a portion or the entire balance of their recurring purchase accounts. The electronic store application 252 displays only relevant items (for example, diapers, baby care products of a certain category) to a user who accesses the web server 254. Further, the electronic store allows the user to use his or her recurring purchase account for baby care products when making purchases through the web server 254. It is noted that unlike a typical online retailer (for example, the retailer who operates the server 14A in FIG. 1), the electronic store 252 is operated by the system 250 and is limited to a particular product category. In an embodiment, the electronic store 252 is accessible only to owners or beneficiaries of recurring purchase accounts. In at least some of the embodiments, the electronic store 252 only accepts the funds in recurring purchase account as a form of payment to simplify the check-out process.

Further, a system similar to the systems 10, 100, 150, 200, and 250 may operate with a debit card or a similar account restricted to a particular online retailer or to the baby care product management system itself. The debit card at the same time may not be restricted to particular stock-keeping units (SKUs), and thus could be easily integrated with any existing electronic stores. In a sense, the debit card may be similar to a gift card, except that a financial institution (for example, the financial institution 130 of FIG. 2) manages the debit card in these embodiments.

Referring generally to FIGS. 1-5, the systems 10, 100, 150, 200, and 250 in some embodiments allow users to apply their recurring purchase accounts to a certain category of baby care products rather than to a particular product. In particular, a mother may apply her account toward purchases of diapers of one size during one period of time, and continue using her account to purchase diapers of a larger size during a later period of time. Further, in at least some of the embodiments, a parent of multiple children can apply the account to purchases of different baby care products (for example, infant diapers, cruisers) at the same time. Still further, users can transfer account balances to each other in some embodiments of the system 10, 100, 150, 200, or 250.

Figure 6:
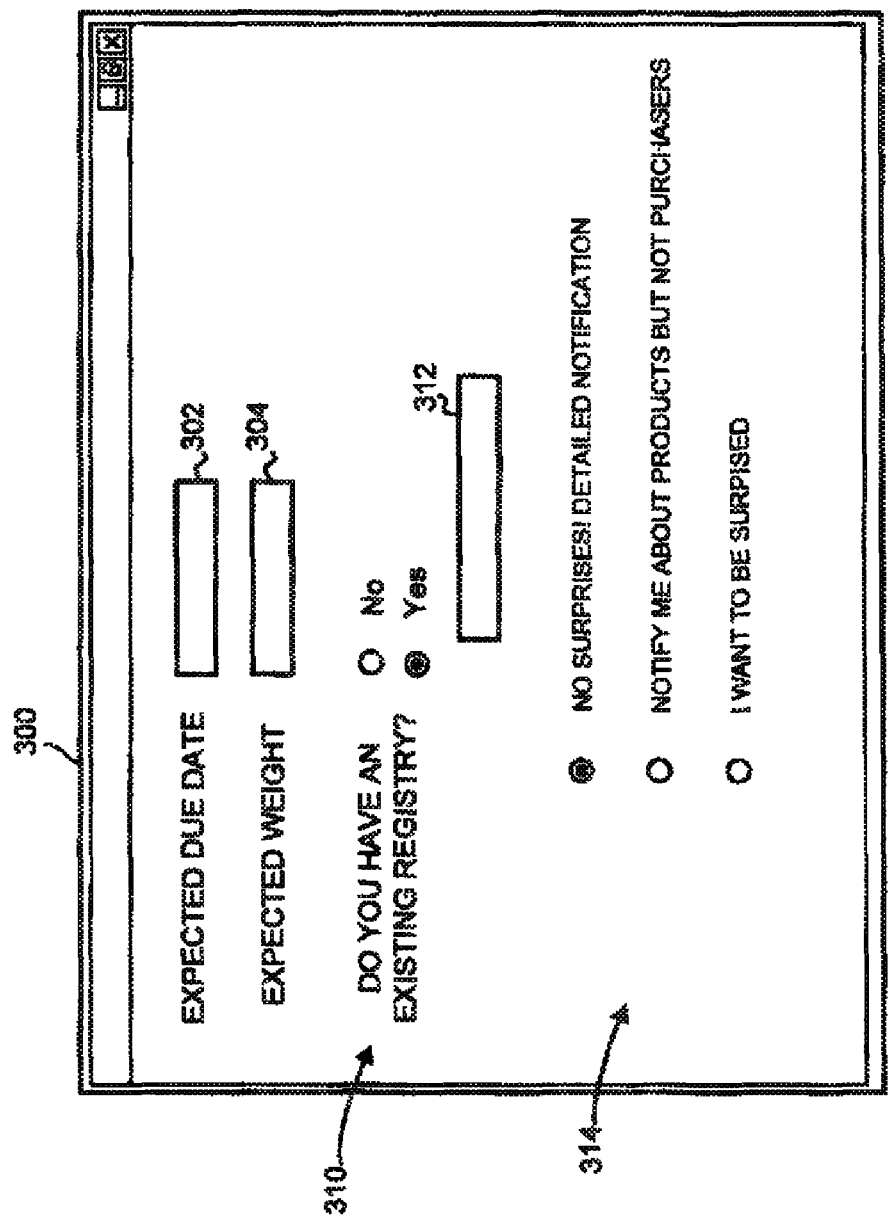
FIG. 6 depicts an example screen which the baby care system of FIG. 1 presents to a user when configuring a new registry.

Now referring to FIG. 6, the registry manager 61 (see FIG. 1) in an embodiment presents a screen 300 to a user who wishes to set up a new registry with the system 10. The screen 300 includes a fill-in form 302 in which the user specifies the expected due date and a fill-in form 304 in which the user specifies the expected weight of the child. Further, the user specifies whether she already has a registry at a participating retailer via a checkbox area 310 and, if one or several of such registries exist, she can specify the retailer via a fill-in form 312. A radio button 314 allows the user to select a notification preference (for example, detailed notifications, purchase-only notifications that do not reveal the identities of the purchasers, no notifications). In another embodiment, the notification preference is obtained via a separate dialogue. Upon completion of registration, the registry manager 61 stores the information supplied via the screen 300 in the database 50 and, in some cases, initiates a process of importing an existing gift registry.

Figure 7:
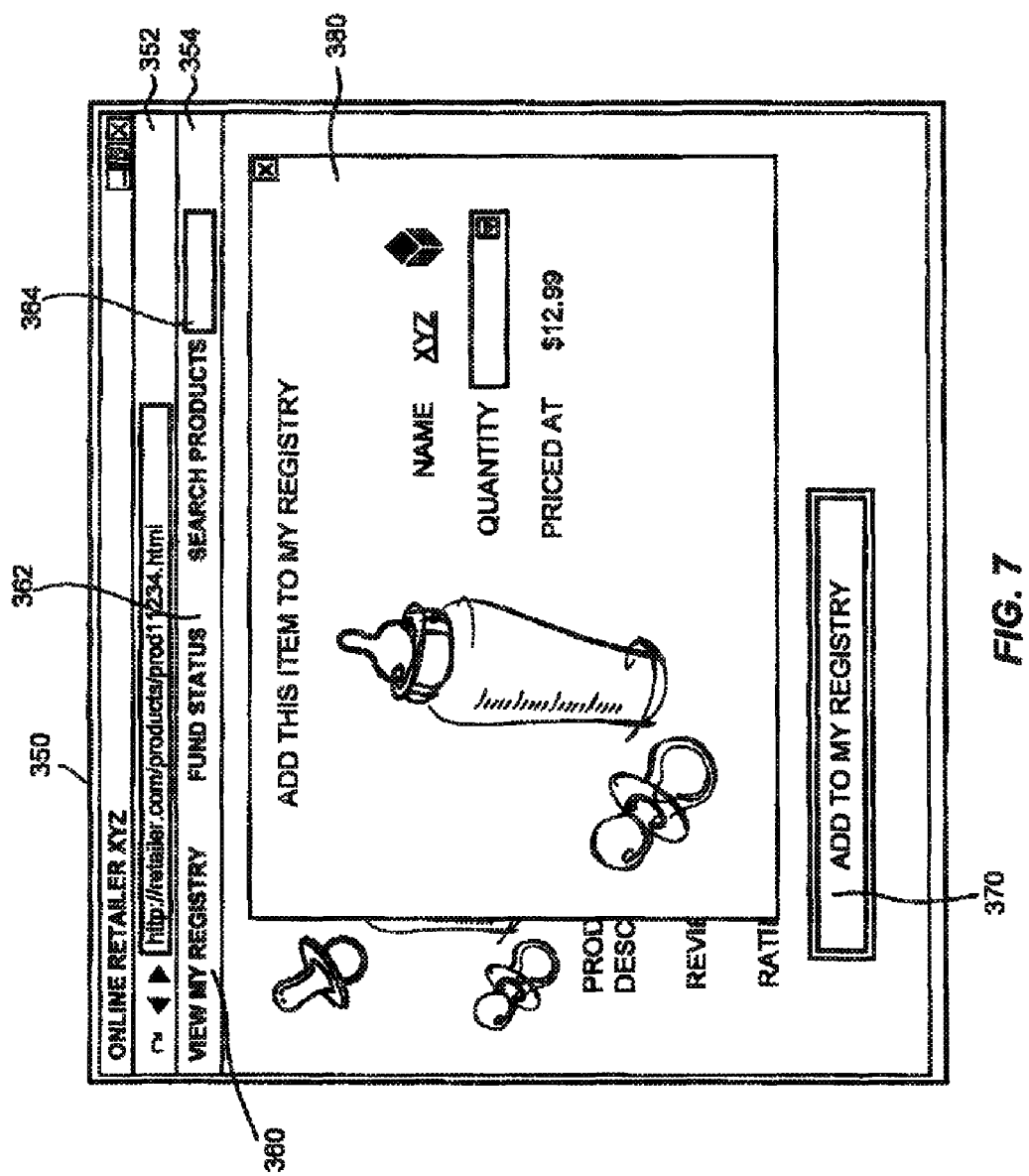
FIG. 7 depicts an example screen displayed at a web site maintained by an online retailer or at a website maintained by the baby care system of FIG. 1 when a user selects an item to be added to the registry.

FIG. 7 illustrates a screen 350 through which a user can interact with a participating online retailer. For example, the screen 350 can be generated in response to a user accessing the server 14A. In addition to a standard navigation bar 352, the screen 350 includes a baby care product registry toolbar add-on (hereinafter, "baby care toolbar") 354 which can be supplied as a set of APIs for use on a website of the participating retailer. One such API automatically analyzes the metadata (for example, tags) on the web site to determine the identity of the online retailer. Another API automatically determines the SKU or another type of identity of a product selected on the screen 350. The baby care toolbar 354 allows users to directly access the functionality of the system 10 (or, in some cases, 100, 150, 200, or 250). In this embodiment, the baby care toolbar 354 includes a view my registry control 360, a fund status control 362, and a search products window 364. The user activates the control 360 to view the entirety or a portion of her registry, the control 362 to check the status of the recurring purchase account for baby care products such as diapers. In an embodiment, the baby care toolbar 354 displays the status of the recurring purchase account as a graphic (for example, an indicator bar filled with a certain color according to the amount of accumulated funding relative to a certain goal). Further, the user can use the window 364 to search for products on the web site of the retailer.

Further, the online retailer in this example includes an add to my registry button 370 for adding a product displayed on the screen 350 to a baby item product registry maintained by the system 10. Referring back to FIG. 1, activation of the button 370 can invoke the API 72 to efficiently transmit the selection to the baby care product selector 64. In the example illustrated in FIG. 7, a user has clicked on the button 370, and the online retailer has generated a dialogue screen 380. The dialogue screen 380 in this embodiment displays a picture of the product, the name and the logo of the online retailer, a quantity pull-down selector, and a price listing. In some embodiments, the dialogue screen 380 is generated by the baby care system such as the system 10 rather than by the online retailer.

It is also noted that by activating an appropriate control such as the button 370, the user in some embodiments adds the selected product both to the registry maintained by the system 10 and to the retailer-specific registry associated with the site at which the user made the selection. In other words, the participating online retailer may continue to manage a registry of products specific to the online retailer, but at least some of the product selections are also added to the registry maintained by the system 10 for access by the corresponding user and the participants. In yet another embodiment, the button 370 is used only for adding the product to the registry associated with the online retailer, and the user invokes a function (not shown) on the toolbar 354 dedicated to adding a product to the appropriate registry of the system 10.

In another embodiment, the screen 350 is generated by the web gateway 42. In this embodiment, the user can browse web sites of participating retailers via the system 10, i.e., by interacting with the web gateway 42 that in turn interacts with a participating retailer to retrieve a list of baby care products, the associated prices, etc. It is noted that in this embodiment, the system 10 advantageously can control the format and the content of the screen 350. Moreover, by presenting standard screens (for example, dialogue screen 38) irrespective of the currently selected online retailer, the system 10 provides additional comfort and convenience to the user and generally improves user experience.

Figure 8:
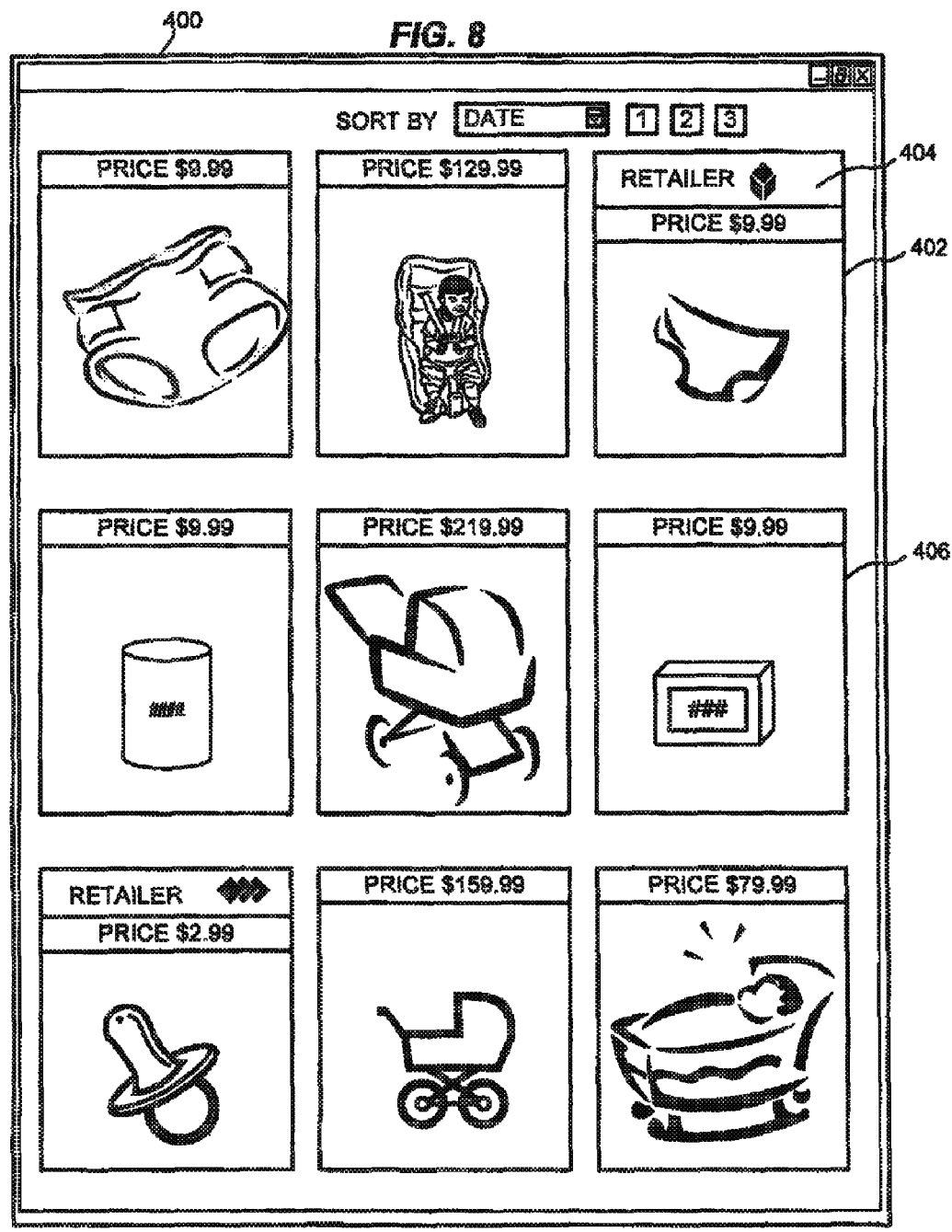
FIG. 8 depicts an example screen the baby care system of FIG. 1 presents to the user when he or she views the contents of the registry.

Referring now to FIG. 8, the purchase manager 62 (see FIG. 1) or another component can generate a screen 400 when participants and users view the contents of the registry. The screen 400 in this embodiment displays a picture of each product along with the associated price. For certain products, the screen 400 additionally lists an online retailer from which the product was originally selected. For example, a screen area 402 includes a retailer identifier 404 that can direct the user to the web site of the identified retailer upon selection. By contrast, a screen area 406 does not include a retailer identifier, and accordingly indicates to the user or participant that the item is purchased directly from the system 10 upon selection.

Figure 9:
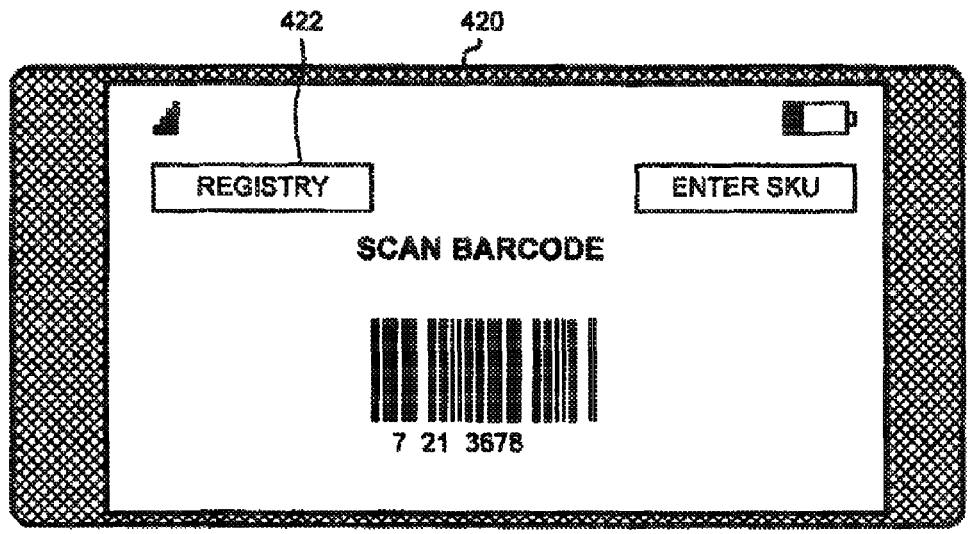
FIG. 9 depicts an example screen of a portable smart device upon scanning a bar code of a product that a user wishes to add to the registry maintained by the system of FIG. 1.
Figure 10:
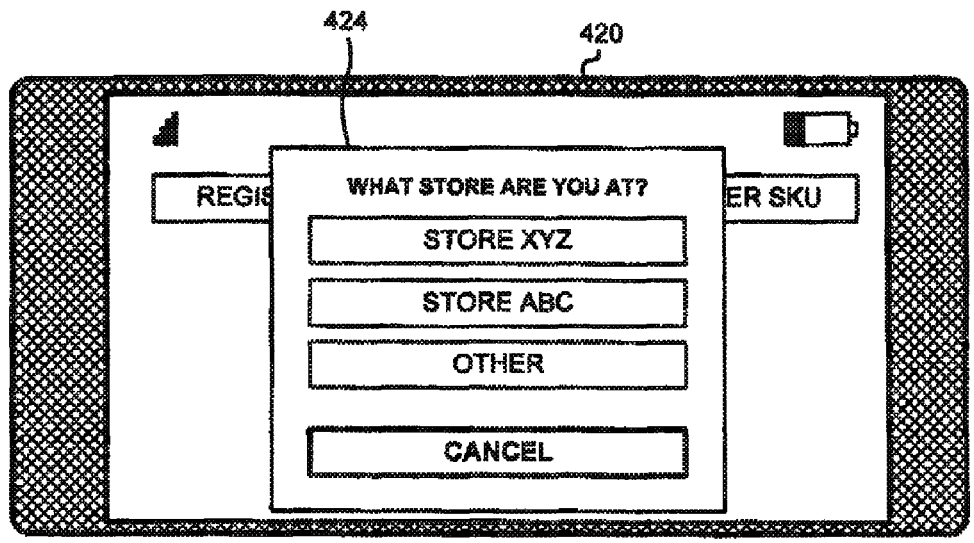
FIG. 10 depicts the screen of FIG. 9 with a dialogue for selecting a retailer in the foreground.
Figure 11:
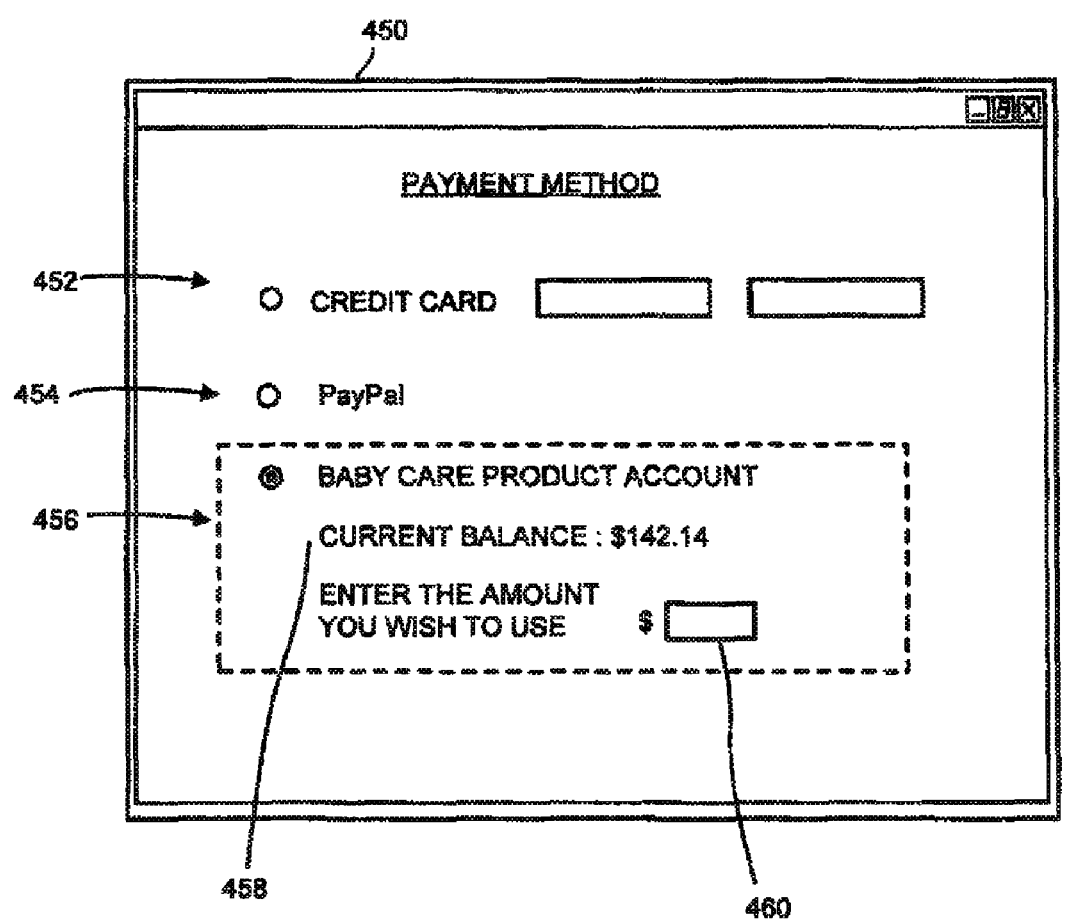
FIG. 11 depicts an example screen that can be presented to a user when making a payment method selection.

Next, FIG. 9 illustrates a screen of a portable device 420 such as a smartphone equipped with a barcode scanner which a user can use when shopping in person at a participating retailer. The portable device 420 implements the product selection application 70 (see FIG. 1) or a similar application. As is known, most products retailed in the United States are labeled with an appropriate Universal Product Code (UPC), typically specified as a barcode. Upon scanning in the UPC of a product, the user activates the registry control 422. As illustrated in FIG. 10, the application then displays a dialogue 424 via which the portable device 420 receives a selection of the retailer where the user has scanned in the product. The portable device 420 then transmits the product identity and the store identifier to the baby care system, where the transmitted information is added to a database (for example, the database 50 illustrated in FIG. 1).

As discussed above, a user can apply a portion of the entirety of a recurring purchase account toward purchasing baby care products at a baby care item management system or at a participating retailer. FIG. 10 illustrates an example payment method dialogue screen 450 that includes a credit card payment option 452, a PayPal payment option 454, and a baby care product account payment option 456. The baby care product account payment option 456 displays the current balance and allows the user to specify a partial amount of the available balance, if desired.

In general, it is noted that users and participants can access the system 10, 100, 150, 200, or 250 via applications or widgets on any suitable platform including social networking sites, smartphone application environments, etc.

Figure 12:
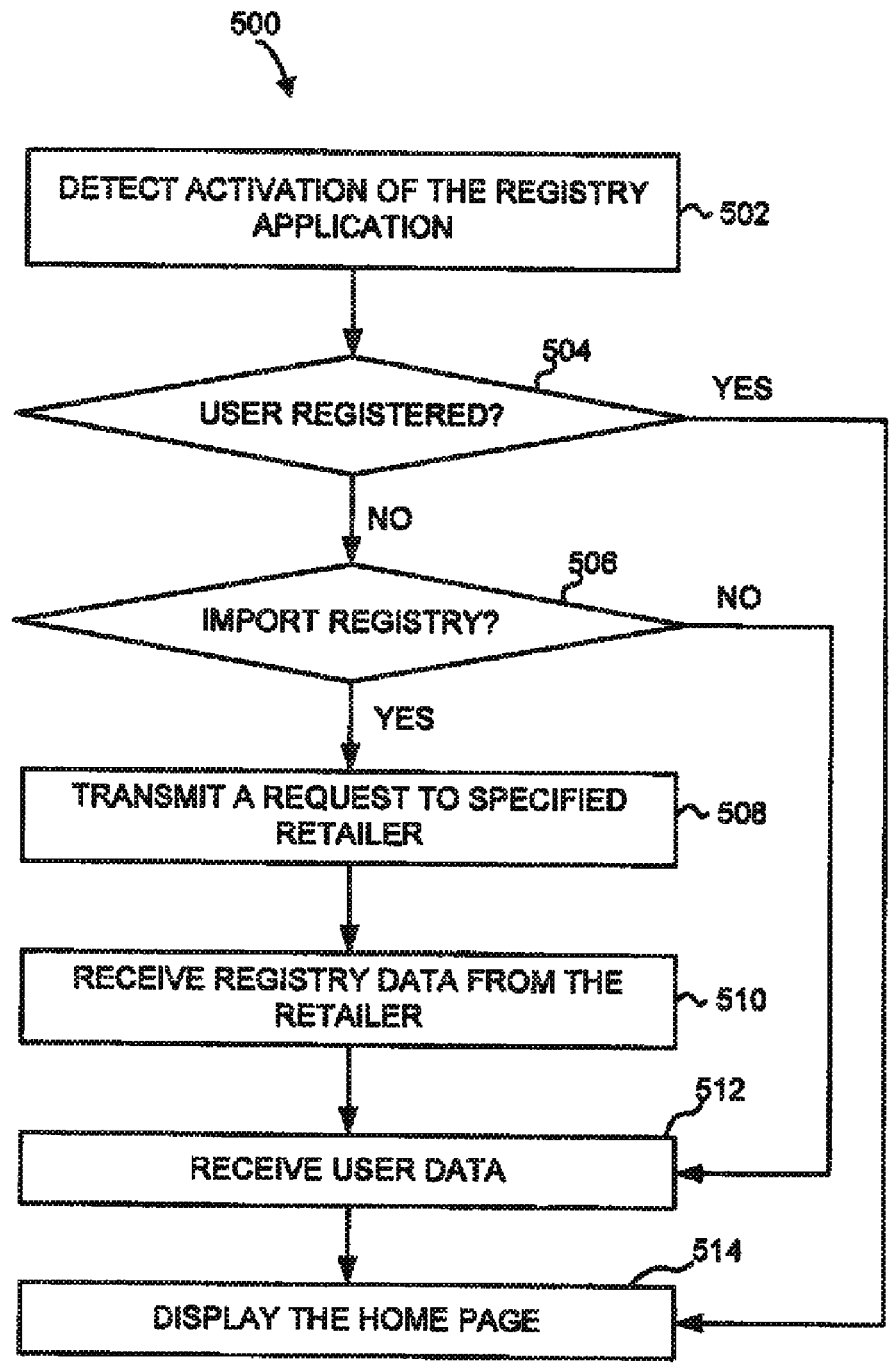
FIG. 12 is a flow diagram of an example method which the system of FIG. 1 can implement to set up a registry in response to a request from a user.

Now referring to FIG. 12, a module or application such as the registry manager 61 (see FIG. 1) can implement a method 500 to set up a registry in response to a request from a user. At block 502, a request to activate a registry application is received from a user who has clicked on a hyperlink advertising baby care product registry, for example. User data in one embodiment is supplied in the form of a cookie. At block 504, prior user registration is check and, if the user has not previously registered, the user is offered to import an existing registry (block 506) via a dialogue screen such as the one illustrated in FIG. 6, for example. If the user specifies a registry that exists at a participating retailer, a request to the specified retailer is automatically generated at block 508, and the corresponding response is processed at block 510. Otherwise, if the user chooses not to import a registry, the method 500 proceeds to block 512 at which user data (for example, contact information, expected due date, etc.) is received. Finally, the user is taken to his or her homepage at block 514.

In addition (or as an alternative) to directly providing user registration via an appropriate web form, the registry manager 61 may also support registration via a social networking site such as Facebook, for example. In an example scenario, a social networking site operating on the social network 18 supports a widget for accessing the system 10 (or a similar system that manages a product registry, a recurring purchase account, or both). A user logged into his or her social networking site account activates the widget, and the widget automatically generates and transmits a message to the system 10 to check whether the user is already registered with the system 10. If the user is registered, the social network server 18 receives the relevant user data from the system 10 and displays a homepage that may appear similar or identical to the homepage generated at block 514 (see FIG. 12). In particular, the homepage may display registry items, comments from the registry participants, the status of the recurring purchase account, if available, and other data specific to the system 10. In an embodiment, the homepage also includes information specific to the social networking site such as photographs of the participants, comments entered via the social networking site, etc.

On the other hand, if the system 10 indicates that the user has not previously registered with the system 10, the social network server 18 may display a dialogue to approve sharing of certain user data between the system 10 and the social networking site. As discussed above, the sharing is used in certain embodiments to integrate features of the social networking site, such as messaging or certain types of messaging, with the features of the system 10 discussed herein.

Figure 13:
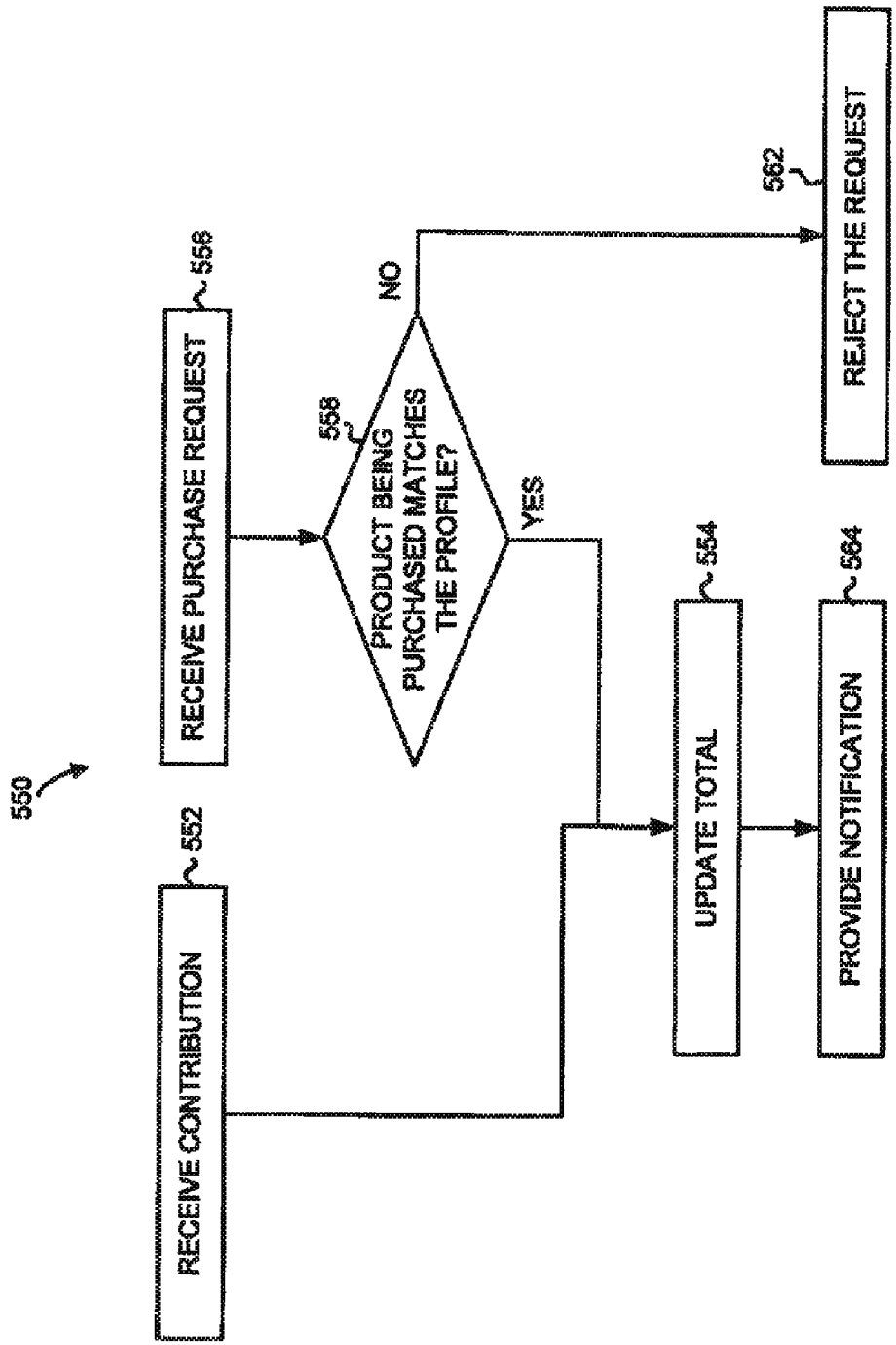
FIG. 13 is a flow diagram of an example method which the system of FIG. 1, 2, or 3 can implement to update the balance of an account dedicated to recurring purchases of baby care products upon receiving a contribution from a participant or a purchase request from a user.

Referring to FIG. 13, a system for maintaining a recurring purchase account can implement a method 550 to update the balance of an account dedicated to recurring purchases of baby care products in response to an event. As one example, some of the blocks illustrated in FIG. 13 can be implemented by the contribution manager 62, and some of the blocks can be implemented by the purchase manager 68. In particular, at block 552 a contribution from a participant is received for the recurring purchase account of a specified user, and the total amount of money pledged to the account is updated at block 554. In another scenario, a request to pay for a purchase using the account is received at block 556 and, upon verifying that the product being purchased is in fact a baby care item matching the profile of the recurring purchase account (block 558), the balance is similarly updated at block 554. If the product being purchased does not match the profile of the recurring purchase account, the purchase request is rejected at block 562. Otherwise, a notification is provided at block 564 in accordance with the user profile. As discussed above, a user may be notified regarding her new balance if a purchase has been made or, if a contribution has been made by a participant, an email or a text message can be generated and transmitted to the user.

Structural Basis for the Baby Care Product Management System

Figure 14:
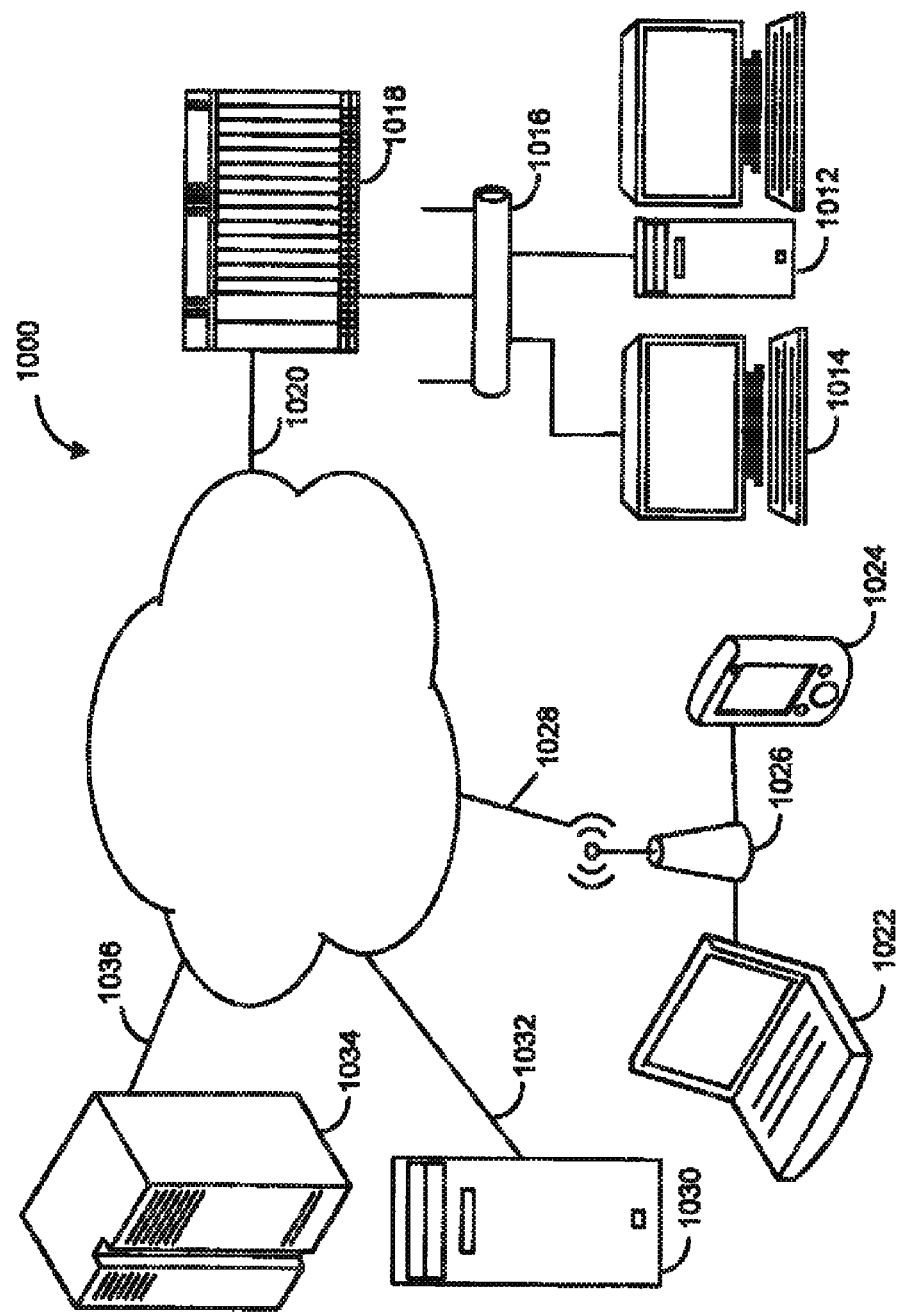
FIG. 14 is a block diagram illustrating an example computer network.
Figure 15:
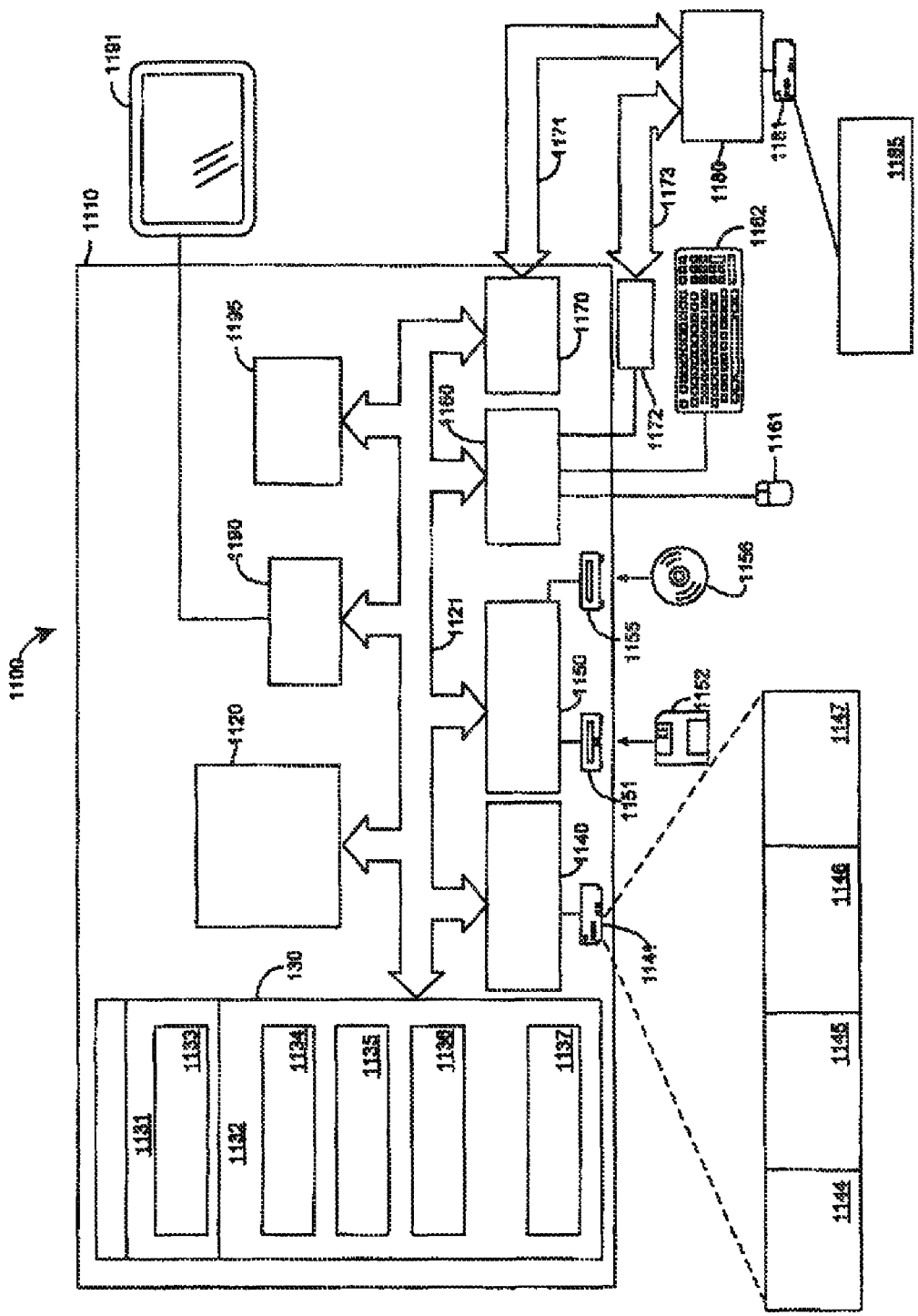
FIG. 15 is a block diagram illustrating an example computer that may be connected to the network of FIG. 14.

FIGS. 14 and 15 provide a structural basis for the network and computational platforms related to the instant disclosure.

FIG. 14 illustrates a network 1000. The network 1000 may be the Internet, a virtual private network (VPN), or any other network that allows one or more computers, communication devices, databases, etc., to be communicatively connected to each other. The network 1000 may be connected to a personal computer 1012, and a computer terminal 1014 via an Ethernet 1016 and a router 1018, and a landline 1020. The Ethernet 1016 may be a subnet of a larger Internet Protocol network. Other networked resources may also be supported via the Ethernet 1016 or another data network. On the other hand, the network 1000 may be wirelessly connected to a laptop computer 1022 and a portable device such as a personal data assistant 1024 via a wireless communication station 1026 and a wireless link 1028. In general, the portable device can also be a smartphone (for example, the smartphone 22 depicted in FIG. 1) or any other device capable of wireless communications, and the wireless communication station 1026 can be associated with any type of a wireless network (for example, a cellular infrastructure network such as the network 20, a wireless LAN). Similarly, a server 1030 may be connected to the network 1010 using a communication link 1032 and a mainframe 1034 may be connected to the network 1010 using another communication link 1036. The network 1000 may be useful for supporting peer-to-peer network traffic.

FIG. 15 illustrates a computing device in the form of a computer 1110. Components of the computer 1110 may include, but are not limited to a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, PCI Express (PCIe) bus, Accelerated Graphic Port (AGP) bus, and so on.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 15 illustrates operating system 1134, application programs 1135, other program modules 1136, and program data 1137.

The computer 1110 may also include other removable/non-removable, volatile/nonvolatile computer storage media. By way of example only, FIG. 15 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 15, provide storage of computer readable instructions, data structures, program modules and other data for the computer 1110. In FIG. 15, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. However, it will be understood by one of ordinary skill in the art that different modules may be combined or subdivided. A user may enter commands and information into the computer 1100 through input devices such as a keyboard 1162 and cursor control device 1161, commonly referred to as a mouse, trackball or touch pad. Input devices are often connected to the processing unit 1120 through an input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a graphics controller 1190.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 15. The logical connections depicted in FIG. 15 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1711 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the input interface 1160, or other appropriate mechanism. In a networked environment, program modules depicted relative to the computer 1110, or portions thereof, may be stored in the remote memory storage device. By way of example, and not limitation, FIG. 15 illustrates remote application programs 1185 as residing on memory device 1181.

The communications connections 1170, 1172 allow the device to communicate with other devices. The communications connections 1170, 1172 are an example of communication media. The communication media typically embodies computer readable instructions, data structures, program modules or other data in a modulated data signal such as a carrier wave or other transport mechanism and includes any information delivery media. Computer readable media may include both storage media and communication media.

Referring back to FIGS. 1-6, the systems 10, 100, 150, 200, and 250 implement and are coupled to respective networks similar to the network described in FIG. 14. The systems described with reference to FIGS. 1-6 may further include and/or be implemented on one or more computers similar to the computer 1100 described in FIG. 15. Also, servers such as the application server 44, the web gateway server 42, etc. may be implemented on hosts that include at least some of the components of the computer 110 describe in FIG. 15.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method, in a computer-based online system having a memory, for managing an account for purchasing baby care products by a particular user, wherein the account is for use with a particular category of baby care products, the method comprising:
   electronically receiving a first message including a request to contribute a specified amount to the account, wherein the request is associated with a participant distinct from the user;
   causing the account to be updated in accordance with the first message;
   electronically receiving a second message including a request from the user to apply a certain amount available in the account to a purchase of a specified product;
   determining whether the specified product is a product in the category of baby care products associated with the account; and
   only in response to determining that the specified product is a product in the category of baby care products associated with the account, granting the request to apply the certain amount to the purchase.

2. The method of claim 1, further comprising:
   electronically transmitting an update request to a server operated by a financial institution in response to receiving the first message to update a financial account corresponding to the account in accordance with the first message.

3. The method of claim 1, wherein causing the account to be updated in accordance with the first message includes automatically updating a data record in a database associated with the computer-based online system, the method further comprising:
   providing a selection of baby care products to the user via an electronic store, including limiting the selection to the category of baby care products associated with the account;
   wherein the second message is automatically generated in response to a user selecting the product at the electronic store.

4. The method of claim 1, wherein the category of baby care products corresponds to a non-durable good; the method further comprising:
   automatically calculating an estimated amount of time during which a total amount available in the account satisfies the user's need for the non-durable good; and
   providing an indication including the estimated amount of time to the user.

5. The method of claim 4, wherein the category is limited to age-specific versions of a non-durable good.

6. The method of claim 5, wherein the non-durable good is diapers.

7. The method of claim 4, wherein the non-durable good is diapers.

* * * * *